US011128551B2

(12) United States Patent
Falk et al.

(10) Patent No.: US 11,128,551 B2
(45) Date of Patent: Sep. 21, 2021

(54) METHOD AND APPARATUS FOR IMMEDIATE AND REACTION-FREE TRANSMISSION OF LOG MESSAGES

(71) Applicant: Siemens Mobility GmbH, Bayern (DE)

(72) Inventors: Rainer Falk, Poing (DE); Matthias Seifert, Buchholz (DE); Martin Wimmer, Neubiberg (DE)

(73) Assignee: SIEMENS MOBILITY GMBH

( * ) Notice: Subject to any disclaimer, the term of this patent is extended or adjusted under 35 U.S.C. 154(b) by 0 days.

(21) Appl. No.: 16/649,518

(22) PCT Filed: Sep. 25, 2018

(86) PCT No.: PCT/EP2018/075873
§ 371 (c)(1),
(2) Date: Mar. 20, 2020

(87) PCT Pub. No.: WO2019/063511
PCT Pub. Date: Apr. 4, 2019

(65) Prior Publication Data
US 2020/0322236 A1 Oct. 8, 2020

(30) Foreign Application Priority Data

Sep. 28, 2017 (DE) ...................... 10 2017 217 301.7

(51) Int. Cl.
*H04L 12/26* (2006.01)
(52) U.S. Cl.
CPC ............ *H04L 43/04* (2013.01); *H04L 43/028* (2013.01); *H04L 43/08* (2013.01); *H04L 43/12* (2013.01)
(58) Field of Classification Search
CPC .................. H04L 43/028; H04L 43/04; H04L 43/06–0894; H04L 43/12; H04L 67/1095
See application file for complete search history.

(56) References Cited

U.S. PATENT DOCUMENTS 8,862,718 B2 * 10/2014 Naim ...................... H04L 43/04
709/224
8,935,382 B2 * 1/2015 Sood ...................... H04L 67/22
709/224
(Continued)

FOREIGN PATENT DOCUMENTS

DE    102014226398 A1    6/2016
DE    102015200279 A1    7/2016
(Continued)

OTHER PUBLICATIONS

PCT International Search Report and Written Opinion of International Searching Authority dated Jan. 2, 2019 corresponding to PCT International Application No. PCT/EP2018/075873 filed Sep. 25, 2018.

*Primary Examiner* — Brendan Y Higa
(74) *Attorney, Agent, or Firm* — Schmeiser, Olsen & Watts LLP

(57) ABSTRACT

A method and transmission apparatus for direct and feedback-free transmission of log messages from at least one first network into a second network is provided. Log messages are transmitted individually and directly. The log messages in the first network are monitored by a monitoring device and transmitted into the second network via a one-way data transmission unit. The transmission is thus carried out feedback-free and with integrity protected. Additionally, a log server having a line loop is provided. Local messages are transmitted via the line loop and filtered, monitored by a monitoring device and transmitted directly to a second log server in the second network via the one-way data transmission unit Thus, efficient transmission of log messages into a second network for real-time analysis is achieved.

15 Claims, 2 Drawing Sheets

(56) References Cited

U.S. PATENT DOCUMENTS

| | | | |
|---|---|---|---|
| 9,032,070 B1* | 5/2015 | Stickle | H04L 43/12 709/224 |
| 9,325,589 B1* | 4/2016 | Flynn | H04L 43/18 |
| 9,756,061 B1 | 9/2017 | Roeh et al. | |
| 2006/0083511 A1* | 4/2006 | Edmunds | H04L 43/00 398/25 |
| 2011/0264797 A1* | 10/2011 | Matityahu | H04L 43/06 709/224 |
| 2013/0096442 A1 | 4/2013 | Stahmann et al. | |
| 2013/0179821 A1* | 7/2013 | Bauer | G06F 3/0631 715/772 |
| 2013/0290512 A1* | 10/2013 | Ngoo | H04L 41/0853 709/224 |
| 2015/0023170 A1* | 1/2015 | Kakadia | H04L 43/08 370/235 |
| 2016/0006753 A1* | 1/2016 | McDaid | H04L 63/1425 726/23 |
| 2016/0087861 A1* | 3/2016 | Kuan | H04L 43/065 709/224 |
| 2016/0087871 A1* | 3/2016 | Dixon | H04L 43/04 370/392 |
| 2016/0359900 A1* | 12/2016 | Crisler | H04L 63/1425 |
| 2016/0378577 A1* | 12/2016 | Russell | G06F 3/04842 719/318 |
| 2017/0005886 A1* | 1/2017 | Dade | H04L 41/0604 |
| 2017/0163669 A1* | 6/2017 | Brown | G06N 5/04 |
| 2017/0230270 A1* | 8/2017 | Padinhakara | H04L 63/1425 |
| 2017/0237645 A1* | 8/2017 | Shanbhag | H04L 41/0893 370/250 |
| 2017/0339022 A1* | 11/2017 | Hegde | G06N 3/0445 |
| 2017/0353368 A1 | 12/2017 | Blocher et al. | |
| 2018/0124121 A1* | 5/2018 | Blocher | H04L 63/306 |
| 2018/0159898 A1* | 6/2018 | Gibson | H04L 43/028 |
| 2018/0241654 A1* | 8/2018 | Danichev | H04L 43/067 |
| 2019/0097873 A1* | 3/2019 | Nucci | G06F 11/3476 |
| 2019/0207832 A1* | 7/2019 | Dor | H04L 41/12 |
| 2020/0145318 A1* | 5/2020 | Nainar | H04L 45/04 |

FOREIGN PATENT DOCUMENTS

| | | |
|---|---|---|
| DE | 102015205833 A1 | 10/2016 |
| WO | 2016156063 A1 | 10/2016 |

* cited by examiner

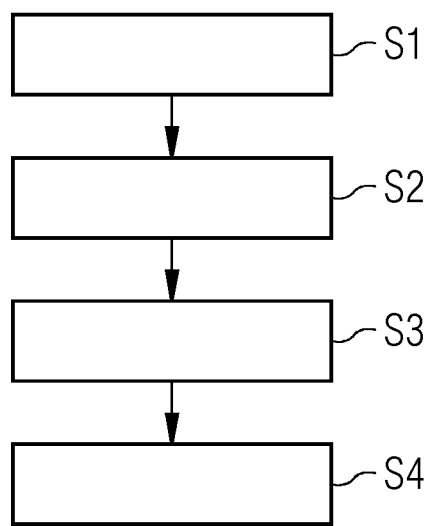
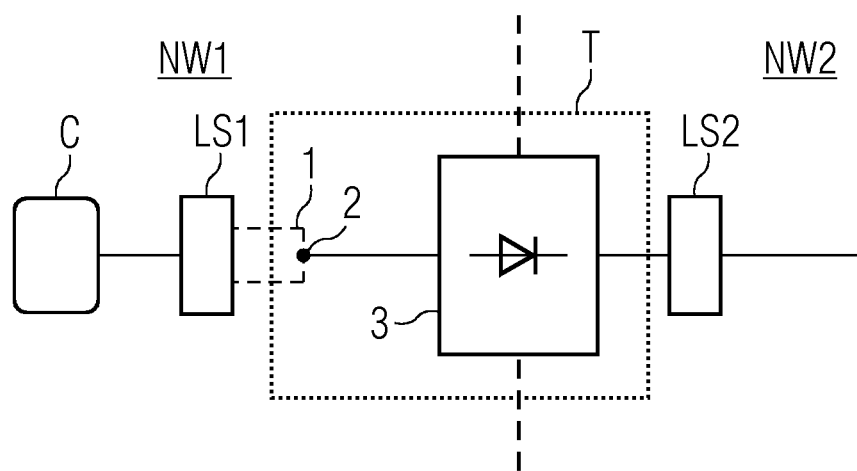

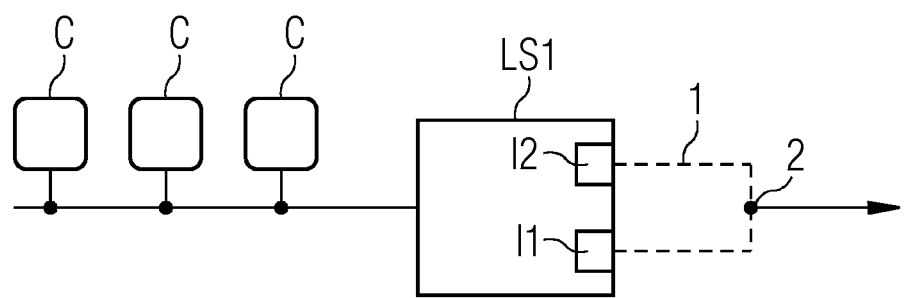
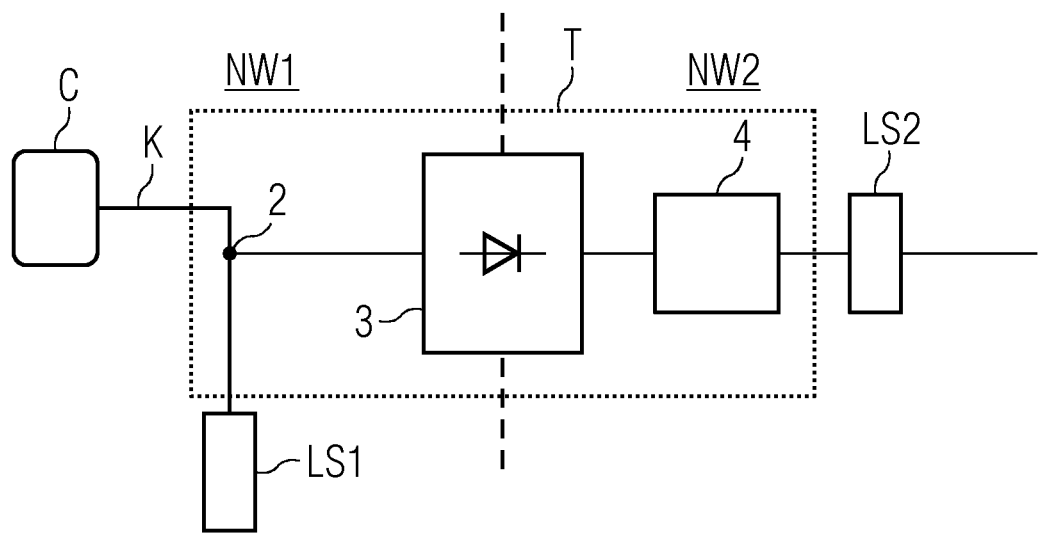

METHOD AND APPARATUS FOR IMMEDIATE AND REACTION-FREE TRANSMISSION OF LOG MESSAGES

CROSS-REFERENCE TO RELATED APPLICATIONS

This application claims priority to PCT Application No. PCT/EP2018/075873, having a filing date of Sep. 25, 2018, which is based off of DE Application No. 10 2017 217 301.7, having a filing date of Sep. 28, 2017, the entire contents both of which are hereby incorporated by reference.

FIELD OF TECHNOLOGY

The following relates to a method and an apparatus for immediate and reaction-free transmission of log messages from at least one first network, for example having a high security requirement, to a second network, for example having a lower security requirement, for the purpose of real-time analysis.

BACKGROUND

In large control networks having a multiplicity of devices, log messages of the respective devices form an important tool for the diagnosis and monitoring of a system. Log messages can provide information about actions, processes, system states and/or changes in this information. Individual log messages or log data can be combined in a log file. To this end, the individual log messages conveyed by the devices are successively written to a file and combined and read during evaluation. A distinction can therefore be drawn between individual log messages and log files.

The individual log messages are usually produced by devices themselves and are typically sent to a log server. A log file, similarly to a diagnosis file, needs to be produced in a further process step. This results in a, sometimes considerable, time offset between the output of a log message by a device and the evaluation of the log message in a log server. Writing and reading log files at the same time, on the other hand, involves a high susceptibility to error, such as e.g. an incorrect order of entries or the reading of incomplete log messages.

Transferring log messages on the basis of log files is therefore complex and not suitable for the real-time monitoring of a control network. In the case of real-time analyses, the log messages need to be able to be evaluated promptly and efficiently after they are produced, however, for example in order to promptly detect a malfunction and be able to initiate a countermeasure automatically. Further instances of application comprise time-critical error analysis and optimized maintenance management, for example.

A connection to security-critical control networks, such as for example industrial installations or rail networks, is subject to stringent security requirements. In security-critical networks, log files for diagnosis are therefore usually transmitted to a second, possibly central, network, since only limited access to the control network exists or is permitted. There are furthermore often security-technical requirements in regard to the data interchange between an isolated network in a security zone and an external, possibly open, network. In this case, it is necessary to ensure that an inadmissible data stream does not enter the security-critical network. The transmission of data from the security-critical network is therefore often realized unidirectionally. This is accomplished by using network taps or data diodes, for example, which ensure the reaction-free coupling of two networks. However, these network components are complex and expensive. Security-critical networks therefore often cannot easily be connected to open networks. Coupling the networks via a filtering firewall or via a virtual private network, VPN for short, does not satisfy the condition of freedom from reaction, i.e. coupling the two networks to one another without introducing data into the security-critical network in the process. This gives rise to particular requirements on the extraction of log messages from the security-critical network for the analysis.

Cloud solutions are known in order to store and analyze log data centrally. This method typically involves converting the log data into a suitable format, however, which in turn requires a conversion at the receiver end. Additionally, the system normally needs to be appropriately adapted in the security-protocol network by means of appropriate hardware and/or software in order to send the log messages to the cloud. These adaptations are complex and the cloud solution is infeasible for a real-time analysis of log messages on account of the data conversion.

PCT/EP2016/055915 describes a one-way coupling apparatus that permits data to be transmitted from a security-critical network to a network having a lower security requirement. The data are transmitted via a separate line loop of a requesting device in the first network and monitored by a monitoring device at the same time. Such data copiers or network taps are known from network monitoring systems. The monitored or copied data communication is conveyed to the diagnosis network. This ensures the required freedom from reaction. The requesting device in the network having a high security requirement can have a conversion unit for format conversion. The data handling is therefore flexible and can be adapted for the evaluation in the second network directly. Additionally, the requesting device can have a memory unit for storing the data, so that the monitoring and conveyance do not have to run continuously.

The conventional art, however, does not describe fast and time-critical conveyance of individual log messages that is additionally supposed to be free of reaction. The writing and reading to a log file and possibly conversion of the file to a different file format for conveyance does not meet the requirement of real time analysis of log messages for monitoring security-critical networks. A malfunction or manipulation would thus be detected only with a certain delay. This also means that it is possible to initiate countermeasures only after a delay. Erroneous control functions can therefore be performed for a relatively long period.

SUMMARY

An aspect relates to provide a simple and inexpensive way of monitoring a system in real time using the log messages of said system without intervening in the system itself in the process.

The method according to embodiments of the invention for immediate and reaction-free transmission of log messages from at least one first network to a second network has the following method steps:
the log messages are conveyed in the first network from at least one device to a first log server,
the log messages are monitored continuously by means of a monitoring device, and the log messages are forwarded to the second network individually and at once, each individual monitored log message is transmitted from the first network to the second network in a reaction-free manner via a one-way data transmission unit, and
the log messages are provided in the second network to a second log server.

The method according to embodiments of the invention allows prompt and unidirectional, i.e. reaction-free, transmission of individual log messages from at least one first network, having e.g. a high security requirement, to a second network, having e.g. a lower security requirement. It is reliably ensured that the second network cannot influence a control function or data transmission in the first network via the unidirectional data transmission path. Log data are provided promptly, i.e. directly, in this case despite the freedom from reaction. The second network does not necessarily need to be interfaced immediately, but rather can also have a remote access. The log messages are handled individually, i.e. they are not stored in a file from which they need to be read again for an analysis. As soon as the log messages are output by the devices, they are sent to a first log server in the first system. This conveyance is typically already set up in control systems. To achieve the aim of analyzing log messages from a system, it is therefore advantageously possible to be linked directly to this transmission. The log messages are monitored continuously in this case. This involves the use of a monitoring device that creates a copy of the message stream. Each individual monitored log message is transmitted to a second server in the second network via a one-way data transmission unit. This method step ensures the freedom from reaction, i.e. prevents an inadmissible data stream from entering the first, possibly security-critical, network.

Additionally, the monitoring device does not have to be integrated into the existing system, that is to say e.g. it is not necessary for new software to be installed. This approach is firstly associated with little complexity and is inexpensive, and secondly is suitable for ensuring the integrity of a system.

In addition, the data transfer does not take place on a file basis, i.e. the log messages can be transmitted and analyzed directly and immediately. The log messages are provided in the second network to a second log server. An identical copy of the log messages is therefore available simultaneously in the diagnosis network and can be analyzed directly.

In one advantageous embodiment, the message stream from devices to the first log server in the first network, which message stream comprises log messages, is monitored without delay.

The message stream from the devices to the first log server in the first network can comprise log messages and further messages, such as e.g. status reports or ping enquiries. The monitoring device, which copies individual log messages identically, is operated continuously. Therefore, the message stream from the devices to the log server can be monitored continuously and without delay. Since it is additionally not necessary to write a log file, this arrangement allows fast and simple transmission of the log messages to the second network and is therefore suitable for the real-time analysis of log messages.

In one advantageous embodiment, the monitored and conveyed log messages are evaluated in the second network and/or an integrity check on the log messages is performed.

The log messages are monitored immediately, according to embodiments of the invention, using the monitoring device. No conversion of the log messages or other processing is required. The copy of these log messages is conveyed to the second network for diagnosis and analyzed. In security-critical control networks, the introduction of analysis devices and analysis software is often not readily possible, since the devices or networks are self-contained or changes would violate the integrity of the network. It is therefore practical to perform an evaluation of the log messages by means of the control units externally. This has the advantage that current software that does not need to be certified for the security network or introduced into the security network can be used to monitor the log messages.

Additionally, an integrity check can take place in order to check the origin and completeness of the log messages. The integrity check can take place by means of a cryptographic checksum, for example.

In one advantageous embodiment, depending on the result of the evaluation of the log messages in the second network, measures are initiated in the first network.

The real-time analysis of log messages can result in a fast reaction to error reports taking place. The immediate transmission of the individual log messages and the consequentially prompt analysis option in the second network allow reports to be reacted to quickly. The maximum delay is short and predictable in the method described. This makes it possible to reliably ensure that a reaction occurs no later than after an ascertained maximum delay on the basis of the necessary message transmission.

By way of example, a provided control signal can activate an error mode of operation in the first network. It is additionally possible for a network connection in the first network to be broken or for a control unit of the first network to be put into an inherently safe operating state.

In one advantageous embodiment, the message stream on the communication connection between at least one device and the first log server is monitored in the first network.

The method according to embodiments of the invention resorts to the presence of a communication connection between the devices and the first log server in the first network, which communication connection is used to convey a message stream comprising log messages. Advantageously, this message stream can be directly monitored using a monitoring device, so that a copy of the log messages is made immediately. The monitoring device can be installed on the existing communication connection, for example. It is therefore not necessary for a new network component or software that receives, possibly edits and subsequently forwards the log messages to be introduced into the existing network. The monitoring device can be operated in parallel with processes in the network and does not disturb them. Hence, the integrity of the network continues not to be violated.

In one advantageous embodiment, the log messages from the monitored message stream are detected and extracted by means of a filter.

The monitored message stream between devices and the first log server in the first network is copied by means of the monitoring device and transmitted to the second network via a one-way data transmission unit immediately and in a reaction-free manner. In order to evaluate the log messages in said second network, they need to be detected and extracted. This is done using a filter that extracts the log messages from a general data traffic. The monitored log messages do not need to be converted to a different format in the process. After the filtering and extraction of the log messages, they can be forwarded to a second log server in the second network, e.g. for the purpose of analysis.

In one advantageous embodiment, the extracted log messages are filtered according to relevance.

After the log messages from the general message stream have been detected and extracted, they can be filtered according to relevance by means of a further filter. By way of example, the received messages can be filtered according to the severity of an error. This has the advantage that a first selection of the log messages is made in order to allow even more efficient evaluation.

In a further advantageous embodiment, the log messages are conveyed via a line loop from a first interface to a second interface of the first log server and monitored on the line loop using a monitoring device.

In this embodiment of the invention, a first filtering of the log messages is achieved implicitly. From the devices in the first network, a message stream goes to the first log server. This message stream also comprises log messages. Instead of recording the message stream between the devices and the first log server on a communication connection, this embodiment involves an additional communication connection from the log server to itself being monitored. The log messages are conveyed from the first log server via an internal line loop. The line loop is a connection between two interfaces of the log server. The arrangement is efficient because the first log server uses the line loop to convey only log messages. The message stream is therefore already filtered in the first network according to log messages. A further advantage relates to the encryption and decryption of log messages. Often, log messages are conveyed from devices to the log server in encrypted fashion and decrypted in the log server. The conveyance of the log messages via the line loop can be configured such that the latter transmits already decrypted log messages. The monitoring device then monitors only the decrypted log messages. As such, the effect is easily achieved that no further decryption needs to be performed in the second network.

In one advantageous embodiment, the second interface of the line loop of the first log server has an address of the second log server as destination address.

The line loop is a connection between two interfaces of the log server. The destination address indicated for the conveyance can be the address of the second log server in the second network. This has the advantage that the log messages conveyed via the line loop are provided with information about the destination in the second network when they are sent on the first interface of the line loop already. However, the conveyance to the second log server is not effected directly, since this would not ensure the required freedom from reaction. The second interface of the line loop receives the address of the second log server as destination address within the first log server, so that the first log server conveys the log messages to itself via the line loop. This conveyance of the log messages via the line loop is monitored by the monitoring device simultaneously. As such, the monitoring device also copies the information about the destination address of the log messages. Since the transfer of the log messages via the line loop already has the address of the second log server as destination address and this information is likewise monitored, the log messages can be transmitted in the second network directly to the second log server. There is no need for conversion of the address information or buffer-storage of the log messages. This method achieves reaction-free and immediate transmission of the log messages to the second network. Additionally, filtering according to log messages in the second network as in the further embodiment of the method according to embodiments of the invention is not necessary, since only log messages are conveyed via the line loop and monitored there.

The apparatus according to embodiments of the invention for immediate and reaction-free transmission of log messages from at least one first network to a second network comprises a monitoring device and a one-way data transmission unit, wherein the monitoring device is designed to continuously monitor the individual log messages in the first network and to forward the log messages to the second network individually and at once and wherein the one-way data transmission unit is designed to transmit each individual monitored log message from the first network to the second network in a reaction-free manner.

The apparatus for immediate and reaction-free transmission of log messages for example from a security-critical diagnosis network to an open diagnosis network is minimally invasive. Since a monitoring device merely monitors the message stream but does not change it, no further component or special software needs to be introduced into the system. The integrity of the system and of the first network is thus protected. The one-way data transmission unit is unidirectional and ensures the freedom from reaction. The apparatus is therefore invisible to the system in the first network. No changes to the system are needed that can interfere with or influence processes. The monitoring device is operated continuously, so that a real-time analysis of the log messages in the second network is possible.

In one advantageous embodiment, the transmission apparatus according to embodiments of the invention is designed to perform the method steps described in order to allow immediate and reaction-free transmission of log messages from a first to a second network.

In one advantageous embodiment, the transmission apparatus according to embodiments of the invention comprises a log message extraction unit, arranged in a second network, that is designed to detect and extract the log messages from the monitored message stream by means of a filter and to provide them to a second log server in the second network.

The transmission apparatus according to embodiments of the invention can be used, without great installation complexity and without changing devices, to examine the log messages of the devices. The introduction of just a monitoring device or a network tap is advantageously minimally invasive: without intervening in the first network, the data communication is monitored and is conveyed to the second network unidirectionally. The filtering according to log messages, which are subsequently forwarded to the second log server for diagnosis purposes, is effected in the log message extraction unit in the second network. The effect achieved with this arrangement is therefore the transmission of a copy of the log messages to an open network, for example, where an analysis can be performed using latest software, for example.

A further aspect of embodiments of the invention relates to a log server for receiving log messages from at least one device, wherein the log server comprises a line loop from a first interface to a second interface of the log server, which line loop is designed to convey the log messages from the first interface to the second interface individually, wherein the second interface has an address of a second log server as destination address and the line loop is designed such that conveyed log messages are monitorable continuously by the monitoring device.

Devices in a network convey log messages to a log server in this network. The monitoring of log messages conveyed via a line loop of such a log server is very fast and efficient. No further filtering of a message stream according to log messages needs to be performed, since this is already performed in the log server. The effect achieved by the destination address indicated in this manner is that the monitored data can be transmitted to a second log server in a second network directly. In addition, there is no need to incorporate an additional component for converting the log messages in the first network, which keeps down installation complexity of the transmission apparatus.

In one advantageous embodiment, the log server comprises a storage medium.

The transmission apparatus according to embodiments of the invention can advantageously be used for the real-time analysis of log messages. Furthermore, a log server with memory affords the option to archive the log messages, to analyze them or to use them for a statistical evaluation.

A further aspect of embodiments of the invention relates to a computer program product (non-transitory computer readable storage medium having instructions, which when executed by a processor, perform actions), comprising program code portions suitable for performing the steps of the method.

BRIEF DESCRIPTION

Some of the embodiments will be described in detail, with reference to the following figures, wherein like designations denote like members, wherein:

FIG. 1 shows a flowchart for the method according to the embodiments of the invention for immediate and reaction-free transmission of log messages from at least one first network to a second network;

FIG. 2 shows a schematic depiction of the transmission apparatus according to the embodiments of the invention comprising a first log server having a line loop;

FIG. 3 shows a log server for receiving log messages comprising a line loop; and FIG. 4 shows a schematic depiction of the transmission apparatus according to embodiments of the invention comprising a log message extraction unit.

Mutually corresponding parts are provided with the same reference signs throughout the figures.

DETAILED DESCRIPTION

A flowchart in FIG. 1 will now be used to show the method for immediate and reaction-free free transmission of log messages from at least one first network to a second network. In the first method step S1, the log messages are conveyed in the first network NW1 from at least one device to a first log server LS1. Log messages are continuously monitored in the second method step S2 by a monitoring device 2, and the log messages are forwarded to the second network NW2 individually and at once. That is to say that the log messages are not initially written to a log file, but rather are forwarded individually and without delay. In the third method step S3, each individual log message monitored by the monitoring device 2 is transmitted from the first network NW1 to the second network NW2 in a reaction-free manner via a one-way data transmission unit 3. The provision of the log messages in the second network NW2 is the fourth method step S4. To this end, the log messages can be filtered via the described line loop 1 of the first log server or via a log message extraction unit 4.

FIG. 2 shows an exemplary embodiment of the transmission apparatus T according to embodiments of the invention for immediate and reaction-free transmission of log messages from at least one first network NW1 to a second network NW2. The log messages are conveyed in the first network NW1 from at least one device C of a system to the log server LS1. In addition, the message stream from the device to the log server LS1 can also comprise further messages besides the log messages. In order to filter out the log messages, an internal line loop of the first log server LS1 is set up or a log server having a line loop according to embodiments of the invention is installed. The filtering according to log messages is effected by virtue of the first log server LS1 only processing log messages and thus only log messages being conveyed via the line loop 1. The monitoring device 2 is used to monitor the message communication that proceeds via the line loop 1. The copied log messages are transmitted to the second network NW2 via the one-way data transmission unit 3. This transmission therefore requires no conversion of the data, can be effected immediately and proceeds in a reaction-free manner. In the second network NW2, the log messages can be conveyed to a second log server LS2. The log messages received in the second log server LS2 are then subjected to an integrity check, evaluated and possibly archived. For example, the log messages can be used to monitor whether a specific device C in the first network NW1 operates correctly. The method according to embodiments of the invention for transmitting log messages in real time can additionally be used to promptly diagnose and rectify a malfunction.

Depending on the result of the evaluation of the log messages, measures are taken in the first network NW1. This can involve in particular a switching signal being provided via an electrical or optical interface (not depicted). As a result, a suitable measure can be automatically taken in the first network. By way of example, a network connection can be broken by a switch actuated by the switching signal, the power supply can be interrupted permanently or briefly in order to force a restart, or an inherently safe error operating state can be activated.

FIG. 3 depicts a log server LS1 according to embodiments of the invention having a line loop. A message stream is conveyed from devices C to the log server LS1 in the first network NW1. This message stream can comprise log messages. Only the log messages are processed further in the log server LS1. A line loop 1 running between a first interface I1 of the log server and a second interface I2 of the log server can be used to convey the log messages. In the process, the log messages are monitored by means of a monitoring device 2 and subsequently transmitted to the second network NW2 (not depicted in this case). In order to make the transmission to the second network NW2 as efficient as possible, the second interface I2 of the line loop 1 is provided with a destination address equivalent to the address of the second log server LS2 in the second network NW2. The first log server therefore conveys the log messages to itself via the line loop 1. At the same time, the monitoring device 2 is used to monitor the log messages, including this destination address, and to transmit them to the second network, as depicted in FIG. 2. In the second network NW2, the log messages are transmitted directly to the second log server LS2, since they already have the address thereof entered as destination address. There is no need for further filtering of the log messages in the second network.

A further advantageous embodiment of the transmission apparatus according to embodiments of the invention is shown in FIG. 4. A communication connection K is used to send a message stream from devices C to the first log server LS1 in the first network NW1. This message stream is monitored with the aid of the monitoring device 2 during the transmission and an identical copy of the messages is created. The copied message stream is transmitted to the second network NW2 in a reaction-free manner via the unidirectional one-way transmission unit 3.

In the second network NW2, the log messages from the message stream are detected and extracted with the aid of a log message extraction unit 4 and forwarded to the second log server LS2. The log messages are therefore filtered from the copied message stream. Further filtering can be performed after the extraction of the log messages, such as for example using preset filters that detect specific categories of log messages. These can subsequently be archived in the second log server LS2 or analyzed.

This apparatus according to embodiments of the invention therefore has the crucial advantage that the log messages of devices, which are usually already created and sent, are conveyed to a diagnosis network directly and without alteration. Additionally, no adaptation of the system or devices is required. The proposed apparatus can therefore be interfaced with an already existing system easily and without great complexity. The monitoring and diagnosis of important log messages are achieved without great delay and in a reaction-free manner.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for immediate and reaction-free transmission of log messages from at least one first network to a second network, the method comprising:
   providing a message stream conveyed in a first network from at least one device to a first log server, wherein the message stream includes log messages;
   monitoring the log messages continuously by a monitoring device circuit,
   forwarding the log messages to the second network individually and at once,
   transmitting each individual monitored log message from the first network to the second network in a reach on-free manner via a one-way data transmission unit, and
   providing the log messages to a second log server in the second network.

2. The method as claimed in claim 1, wherein log messages are monitored without delay.

3. The method as claimed in claim 1, wherein the method further comprises at least one of: evaluating the log messages in the second network and performing an integrity check on the log messages.

4. The method as claimed in claim 3, wherein, depending on the result of the evaluation of the log messages in the second network, measures are initiated in the first network.

5. The method as claimed in claim 1, wherein a communication connection is used to send the message stream between the at least one device and the first log server, and the message stream is monitored in the first network.

6. The method as claimed in claim 1, further comprising: detecting end extracting the log messages from the monitored message stream by a filter.

7. The method as claimed in claim 6, wherein the extracted log messages are filtered according to relevance.

8. The method as claimed in claim 1, wherein the log messages are conveyed via a line loop from a first interface to a second interface of the first log server and monitored on the line loop using the monitoring device circuit.

9. The method as claimed in claim 8, wherein the second interface of the line loop of the first log server has an address of the second log server as destination address.

10. A transmission apparatus for immediate and reaction-free transmission of log messages from at least one first network to a second network, comprising a monitoring device circuit and a one-way data transmission unit, wherein:
    the monitoring device circuit is designed to continuously monitor the individual log messages in the first network and to forward the log messages to the second network individually and at once,
    the one-way data transmission unit is designed to transmit each in monitored log message from the first network to the second network in a reaction-free manner.

11. The transmission apparatus as claimed in claim 10, wherein the individual log messages are monitored without delay.

12. The transmission apparatus as claimed in claim 10, additionally comprising a log message extraction circuit arranged in the second network, that is designed to detect and extract the log messages from the monitored message stream by means of a filter and to provide them to a second log server in the second network.

13. A log server for receiving log messages from at least one device, wherein the log server comprises a line loop from a first interface to a second interface of the log server, which line loop is designed to convey the log messages from the first interface to the second interface individually, wherein the second interface has an address of a second log server as destination address and the line loop is designed such that conveyed log messages are monitorable continuously by a monitoring device circuit.

14. The log server as claimed in claim 13, comprising a storage medium.

15. A computer program product, comprising a computer readable hardware storage device having computer readable program code stored therein, said program code executable by a processor of a computer system to implement a method, directly loadable into a programmable computer, comprising program code portions suitable for performing the steps of the method as claimed in claim 1.

* * * * *